Nov. 13, 1928.　　　　　　　　　　　　　　　　1,691,846
H. R. HALVORSON
TRACTOR
Filed Oct. 5, 1927　　　　　6 Sheets-Sheet 4
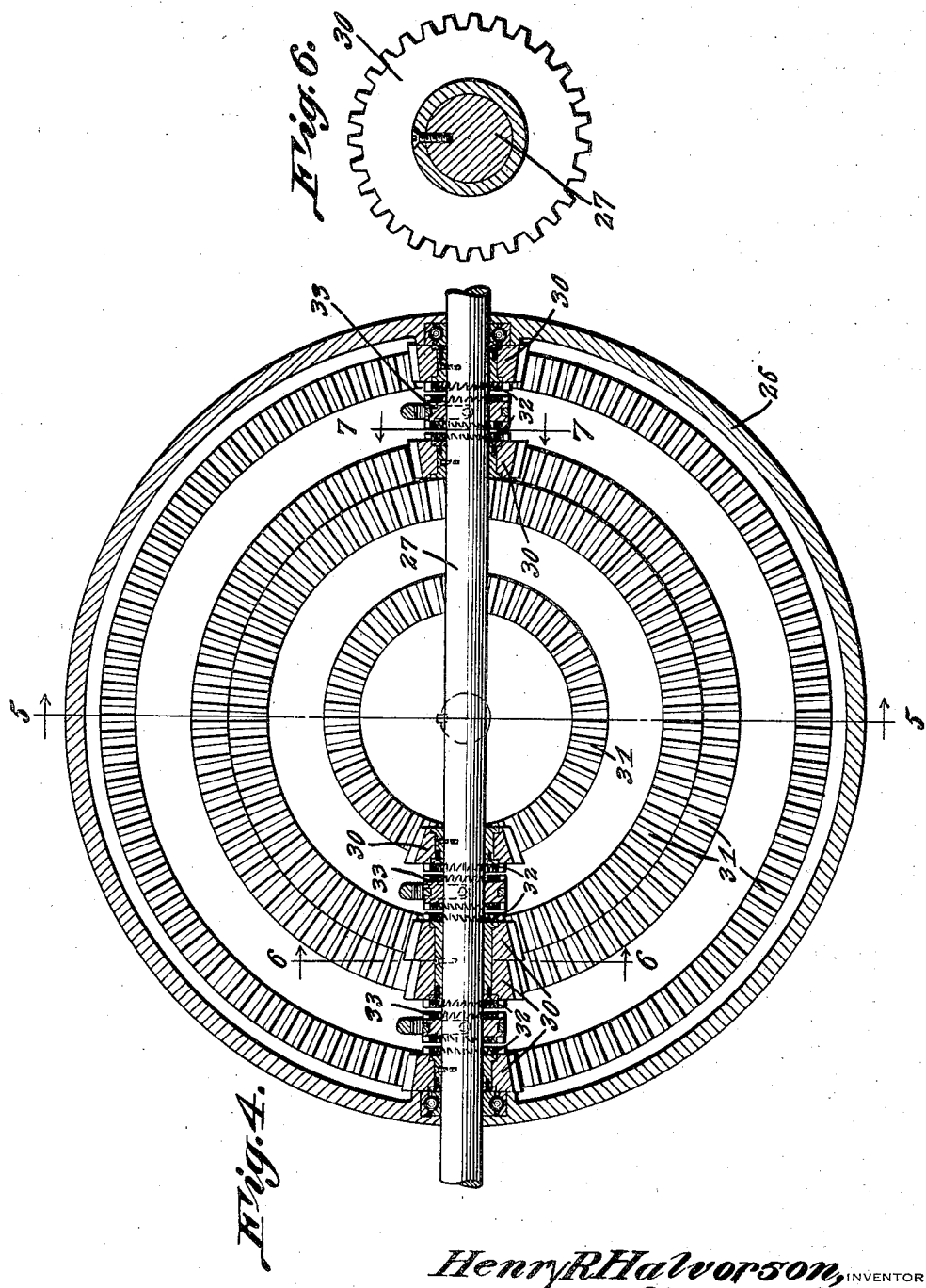

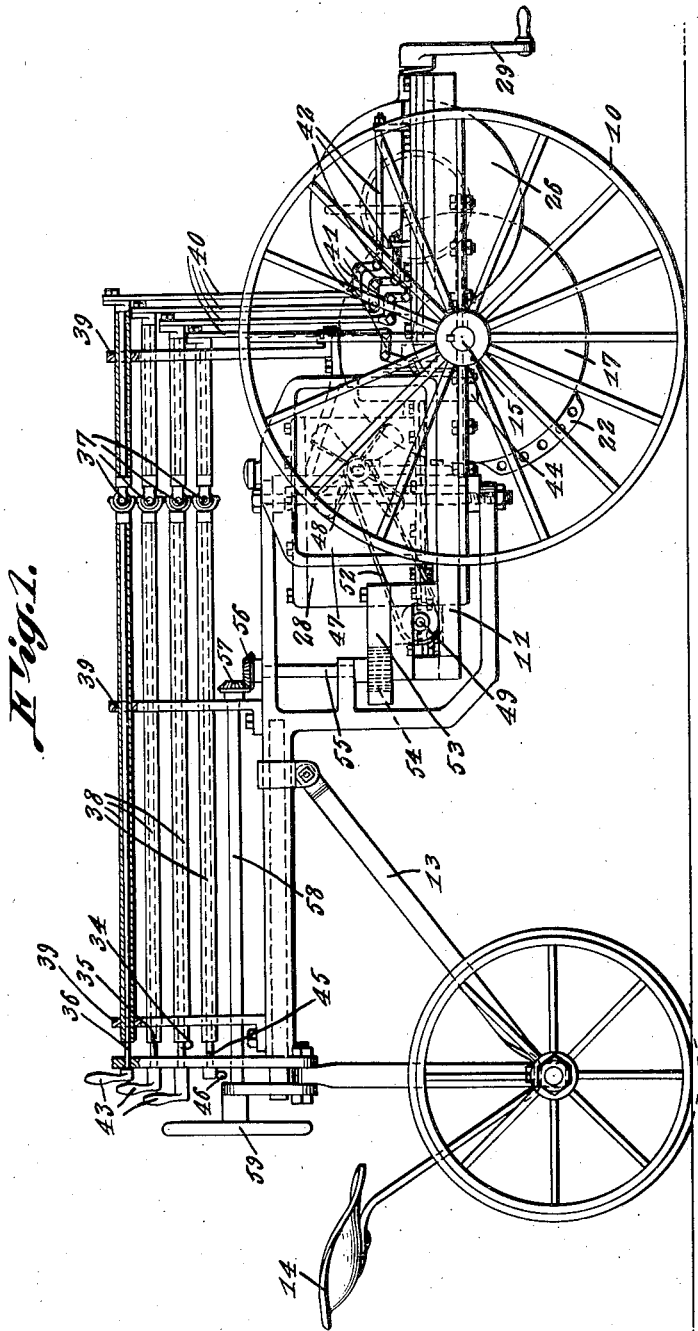

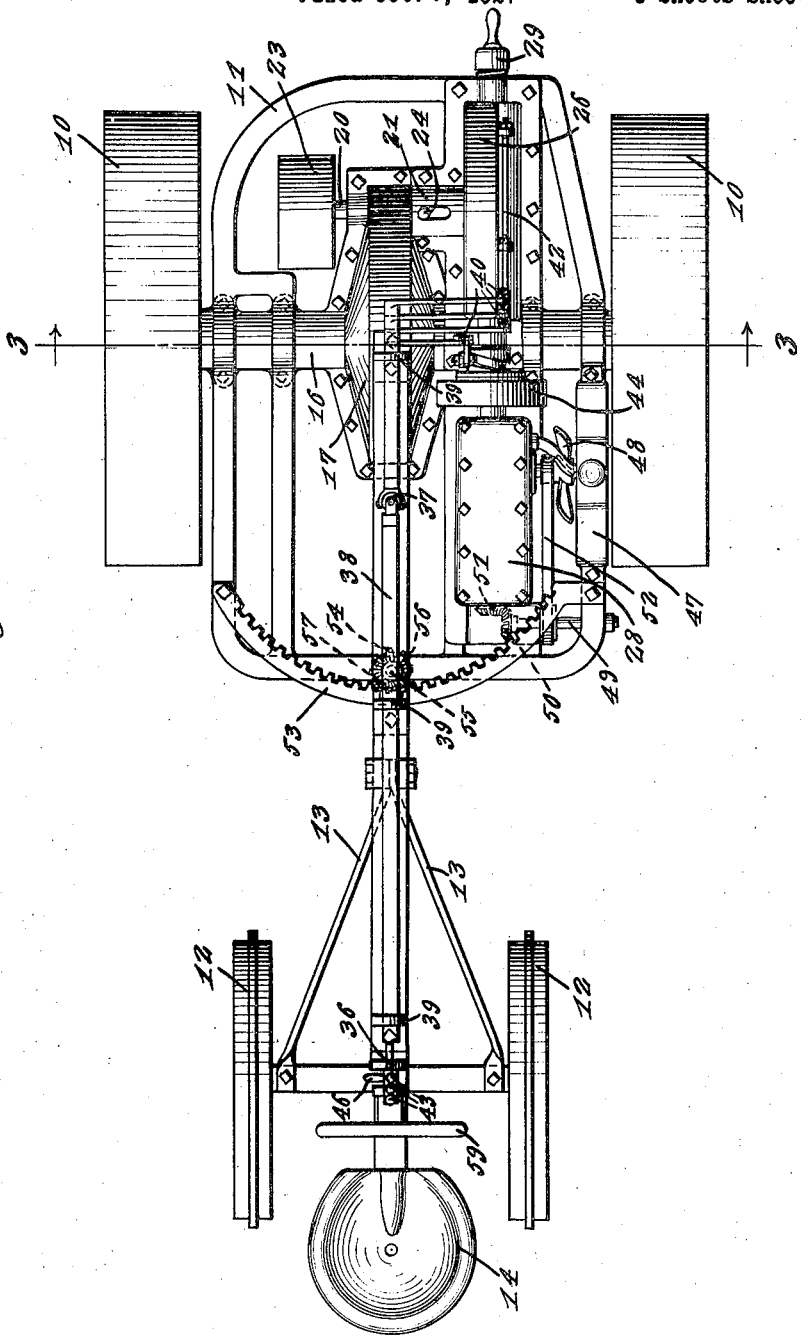

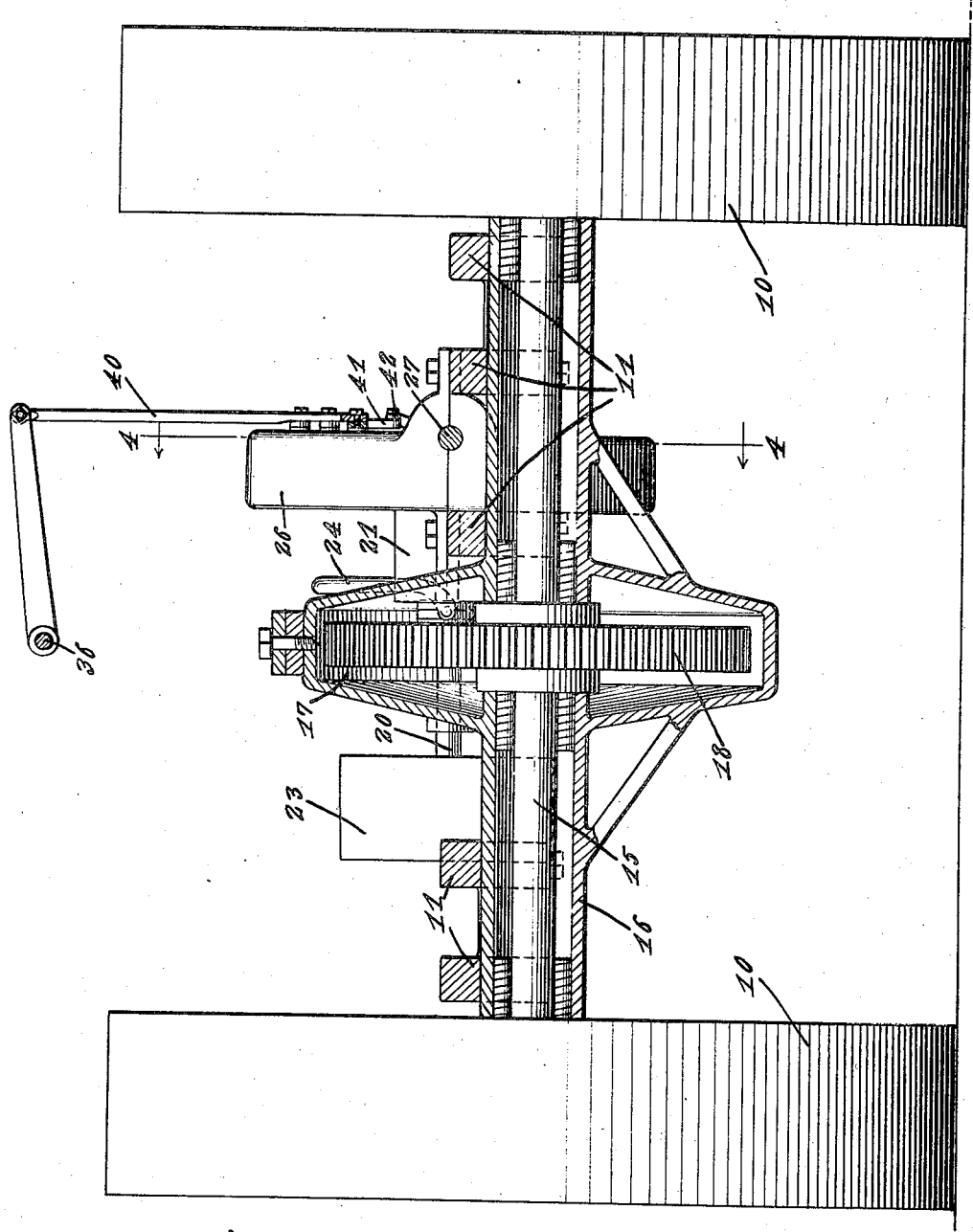

Nov. 13, 1928. 1,691,846
H. R. HALVORSON
TRACTOR
Filed Oct. 5, 1927 6 Sheets-Sheet 5
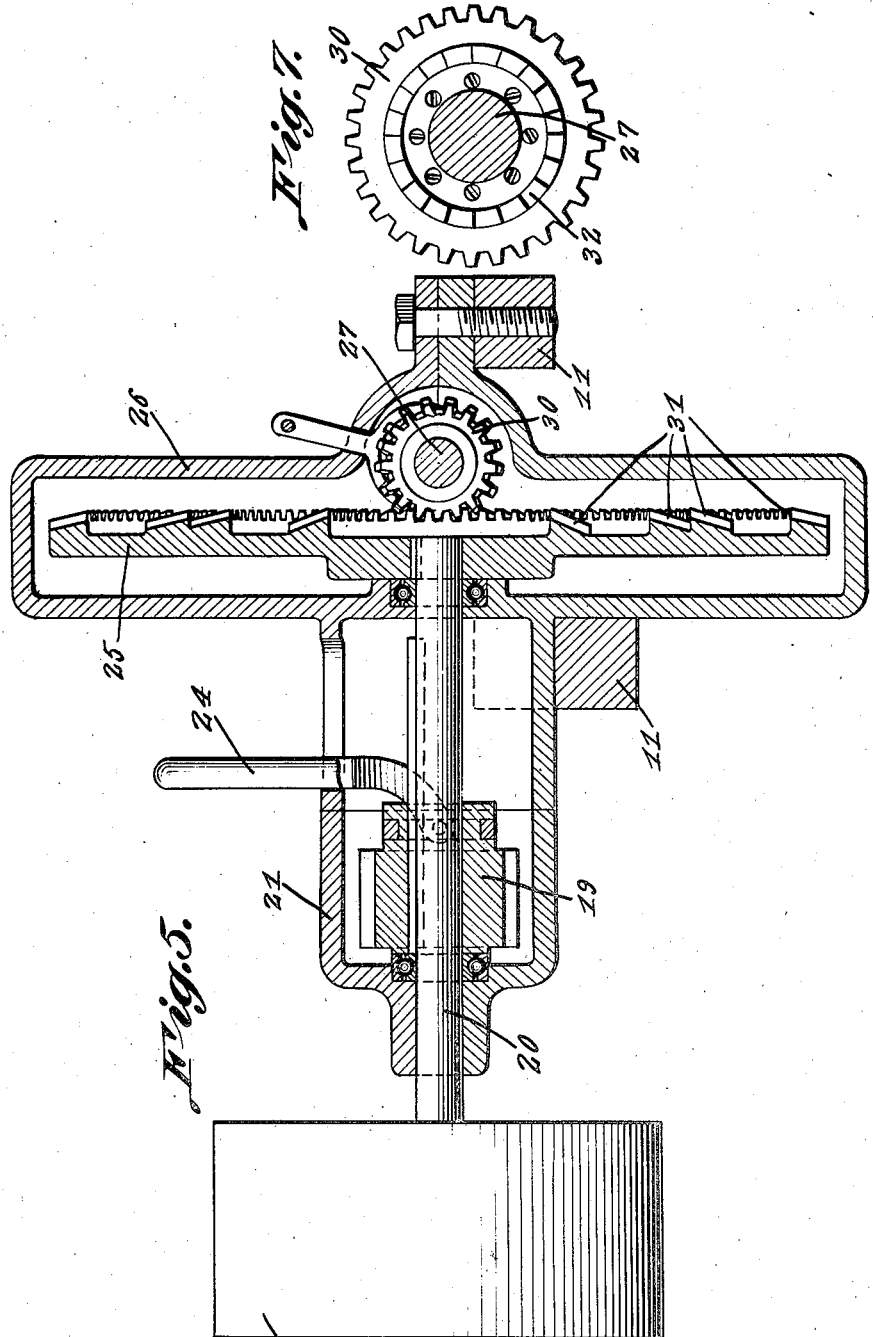

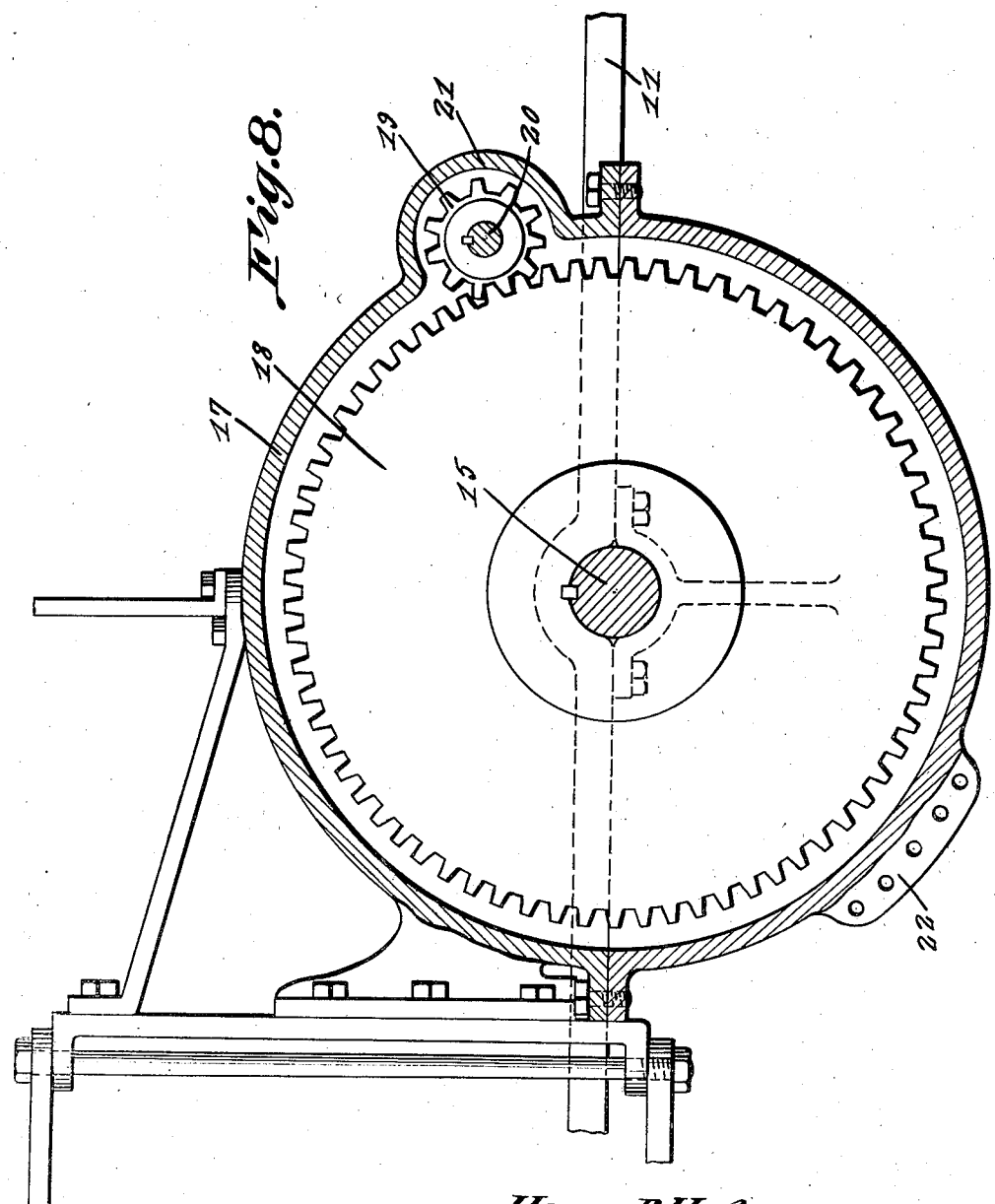

Patented Nov. 13, 1928.

1,691,846

UNITED STATES PATENT OFFICE.

HENRY R. HALVORSON, OF FINLEY, NORTH DAKOTA.

TRACTOR.

Application filed October 5, 1927. Serial No. 224,217.

This invention relates to tractors, and more particularly to a novel construction of means whereby the tractor may be operated and controlled from a remote point, that is to say at a point adjacent the vehicle or other machine being drawn by the tractor, thereby placing the operator in a better position not only to control the tractor, but also the machine attached thereto.

Another object of the invention resides in providing a tractor that can be easily and conveniently guided from a remote point, and turned in a relatively small area, even under a load.

Other objects and advantages will appear when the following detail description is read in connection with the accompanying drawings, the invention residing in the construction, combination and arrangement of parts as claimed.

In the drawings forming part of this application like numerals of reference indicate similar parts in the several views and therein:

Figure 1 is a side elevation.
Figure 2 is a top plan view.
Figure 3 is a sectional view on line 3—3 of Figure 2.
Figure 4 is a sectional view on line 4—4 of Figure 3.
Figure 5 is a sectional view on line 5—5 of Figure 4.
Figure 6 is a sectional view on line 6—6 of Figure 4.
Figure 7 is a sectional view on line 7—7 of Figure 4.
Figure 8 is a sectional view through the drive gear casing and its associated parts.

Referring to the drawings in detail 10 indicates the drive wheels of the tractor, the frame of which is indicated at 11, while arranged at an appreciable distance rearwardly of the frame are ground wheels 12, the axle for which is suitably braced as at 13. The operator's seat is indicated at 14, from which point the tractor is operated and controlled in a manner to be hereinafter described. The axle for the wheels 10 is indicated at 15, while the axle housing is illustrated at 16 and includes a differential casing 17 in which the drive gear 18 and pinion 19 operate. The pinion 19 is keyed to a shaft 20 arranged in a suitable housing 21 forming part of the differential casing 17, while said housing is also provided with a draw bar connection 22. The shaft 20 also supports a belt pulley 23. The pinion 19 is capable of sliding longitudinally on the shaft 20 and is controlled by a lever 24, so that the pinion may be moved out of engagement from the drive gear 18, should it be desired to employ the pulley 23 to operate other machinery. Also keyed on the other end of the shaft 20 is a disk 25 operating in a suitable casing 26, one side of the disk being provided with a plurality of centrally arranged gears for different forward and reverse speeds of the tractor. In other words the tractor has four speeds forward and two reverse. The gears formed on the disk 25 mesh with pinions mounted upon the drive shaft 27 of the motor 28, and the forward end of this shaft is provided with a crank 29 as illustrated. The pinions on the drive shaft are indicated at 30, there being one of these pinions meshing with each of the gears 31 forming part of the disk 25. Each pinion 30 is provided with a clutch face 32, while slidably mounted on the drive shaft, and arranged between each pair of pinions 30 are clutches 33. Manifestly by shifting the clutches into selective engagement with the pinions 30 the forward and reverse movements of the tractor, as well as the speed thereof, can be conveniently regulated or controlled.

For this purpose I provide three shafts indicated at 34, 35 and 36 respectively, and each of these shafts include sections connected by universal joints 37. Each shaft operates in a suitable sleeve 38, and these sleeves are mounted in supports 39 suitably spaced apart. The forward end of each shaft is provided with a crank arm connected with a link 40, and these links are in turn connected with bell crank levers 41 which are associated with operating rods 42, the latter being connected with the clutches 33 above referred to. Each shaft is also provided with a handle 43, and as illustrated in Figure 1, these handles are arranged within convenient reach from the operator's seat 14, so that the shafts can be selectively operated to regulate the speed of the tractor and also control the direction of movement thereof. The clutch for the drive shaft is indicated generally at 44 and is controlled by a similar shaft 45 arranged directly beneath the other shafts above mentioned, the shaft 45 being provided with a handle 46. The radiator for the motor is indicated at 47, while positioned between the motor and radiator is the usual fan 48. A shaft 49 arranged at a right angle to one end of the motor is provided with a bevel gear 50 which meshes with a similar gear 51 attached to the motor shaft, whereby the shaft 49 is rotated from the motor and utilized to operate the fan 48. The fan belt 52 is of course trained over the shaft 49 and the fan shaft as illustrated in Figure 2.

The tractor is guided by a curved rack bar 53 suitably attached to the frame, and which rack bar meshes with a gear 54 secured to a vertically disposed shaft 55 suitably journaled in the frame. The upper end of this shaft 55 is provided with a bevel gear 56, which meshes with a similar gear 57 secured to the steering post 58, this post being equipped with a steering wheel 59 as clearly illustrated in Figure 1. This wheel is arranged adjacent the operator's seat 14 so that the tractor can be conveniently guided from a remote point. It is manifest that by reason of the construction and arrangement of parts herein illustrated and described, the tractor can be controlled from a remote point, thereby permitting the operator to occupy a position an appreciable distance away from the tractor and the noise incident thereto, as well as place the operator in a position to more conveniently manipulate the machine being drawn by or attached to the tractor.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In a tractor, a clutch, an operator's seat arranged remote from the machine, a differential including a driven shaft, a disk associated therewith and having spaced concentrically arranged gears mounted thereon, a drive shaft, pinions mounted thereon and meshing with said concentric gears, a sliding clutch mounted on the drive shaft for each pinion, means for selectively operating said clutches from a point adjacent the seat, to regulate the speed and direction of movement of said tractor, means for steering the tractor, and a clutch operating shaft controlled from said seat.

2. In a tractor, a clutch, an operator's seat remotely disposed from the tractor, a differential including a drive gear, a driven pinion shaft, a pinion slidably mounted on the shaft and normally meshing with said gear, a belt pulley on one end of the shaft, means for shifting said pinion in and out of engagement with said drive gear, a disk carried by the other end of the shaft and having spaced concentrically arranged gears thereon, a drive shaft, pinions mounted thereon and meshing with said concentric gears, a sliding clutch on the drive shaft for each pinion thereon, means for selectively operating said clutches from a point adjacent the operator's seat to regulate the speed and direction of movement of said tractor, means for steering the tractor, and a clutch operating shaft terminating adjacent said seat.

In testimony whereof I affix my signature.

HENRY R. HALVORSON.